United States Patent [19]

Williams et al.

[11] Patent Number: 5,629,907
[45] Date of Patent: May 13, 1997

[54] LOW POWER TIMEKEEPING SYSTEM

[75] Inventors: Clark R. Williams; William J. Podkowa, both of Plano, Tex.

[73] Assignee: Dallas Semiconductor Corporation, Dallas, Tex.

[21] Appl. No.: 571,677

[22] Filed: Dec. 13, 1995

Related U.S. Application Data

[60] Continuation of Ser. No. 142,755, Oct. 25, 1993, abandoned, which is a division of Ser. No. 717,215, Jun. 18, 1991, Pat. No. 5,267,222.

[51] Int. Cl.⁶ .......................... G04C 15/00; G06F 13/00
[52] U.S. Cl. .......................... 368/155; 364/569
[58] Field of Search .......................... 368/10, 155, 156, 368/200–202; 364/200, 900, 569; 395/425, 550

[56] References Cited

U.S. PATENT DOCUMENTS

| | | | |
|---|---|---|---|
| 3,973,110 | 8/1976 | Rode et al. | 364/705.07 |
| 4,035,627 | 7/1977 | Dickinson et al. | 368/155 |
| 4,233,667 | 11/1980 | Devine et al. | 307/465 |
| 4,238,832 | 12/1980 | Tsuzuki et al. | 364/705.07 |
| 4,301,508 | 11/1981 | Anderson et al. | 364/483 |
| 4,320,501 | 3/1982 | LeDieu | 370/63 |
| 4,342,092 | 7/1982 | Kumagi | 364/569 |
| 4,371,932 | 2/1983 | Dinwiddie, Jr. | 364/200 |
| 4,387,420 | 6/1983 | Singhi et al. | 364/569 |
| 4,396,293 | 8/1983 | Mizoguchi | 364/569 |
| 4,435,787 | 3/1984 | Yasuoka | 365/190 |
| 4,512,012 | 4/1985 | Sampei | 370/63 |
| 4,542,480 | 9/1985 | Orii | 364/900 |
| 4,562,537 | 12/1985 | Barnett | 364/200 |
| 4,569,043 | 2/1986 | Simmons | 370/63 |
| 4,575,819 | 3/1986 | Amin | 365/189 |
| 4,581,732 | 4/1986 | Boissean | 370/63 |
| 4,602,347 | 7/1986 | Koyama | 364/569 |
| 4,611,133 | 9/1986 | Peterson et al. | 307/465 |
| 4,615,005 | 9/1986 | Maejima et al. | 364/707 |
| 4,616,347 | 10/1986 | Bernstein | 365/230 |
| 4,620,118 | 10/1986 | Barber | 364/200 |
| 4,658,397 | 4/1987 | Kawamuva | 370/63 |
| 4,672,580 | 6/1987 | Yau et al. | 365/189 |
| 4,672,604 | 6/1987 | Bhatia | 370/58 |
| 4,677,541 | 6/1987 | Singhi | 364/569 |
| 4,680,701 | 7/1987 | Cochran | 364/200 |
| 4,680,752 | 7/1987 | Takemara | 370/63 |
| 4,682,299 | 7/1987 | McIntosh et al. | 364/569 |
| 4,685,085 | 8/1987 | Spence | 365/190 |
| 4,697,105 | 9/1987 | Moy | 307/465 |
| 4,700,086 | 10/1987 | Ling et al. | 307/443 |
| 4,701,907 | 10/1987 | Collins | 370/63 |
| 4,710,653 | 12/1987 | Yee | 307/601 |
| 4,724,520 | 2/1988 | Athanas et al. | 364/200 |
| 4,740,721 | 4/1988 | Chung et al. | 340/825.83 |
| 4,740,915 | 4/1988 | Bonitz et al. | 364/900 |
| 4,744,078 | 5/1988 | Kowalczyk | 364/200 |
| 4,769,562 | 9/1988 | Ghisio | 307/469 |
| 4,794,570 | 12/1988 | Rose et al. | 365/203 |
| 4,796,232 | 1/1989 | House | 364/900 |

(List continued on next page.)

OTHER PUBLICATIONS

Microprocessors–Hardware and applications, 1984, Appendix J–Z80CPU, Z80A–CPU, Section 2.1, pp. 851–853.

Heathkit Continuing Education Individual Learning Program–Microprocessors, Unit 9, pp. 9–143 through 9–147, 1977.

"CMOS Delay Circuit", IBM Technical Disclosure Bulletin, vol. 27, No. 12, May 1985, pp. 7134–7135.

*Primary Examiner*—Vit W. Miska
*Attorney, Agent, or Firm*—Jenkens & Gilchrist

[57] ABSTRACT

A low power timekeeping system utilizes a state machine to first read seconds stored in a RAM and update seconds and then determine if the minutes requires updating. If the minutes do not require updating then the sequencer stops operation until the next update cycle. Similarly, the minutes, hours, days of the week, date of the month, month, and year are updated only as needed in each update cycle thereby lowering the power requirement needed by the timekeeping system.

5 Claims, 8 Drawing Sheets

U.S. PATENT DOCUMENTS

| | | | |
|---|---|---|---|
| 4,809,225 | 2/1989 | Dimmler et al. | 365/154 |
| 4,812,627 | 3/1989 | Wexler | 364/406 |
| 4,815,074 | 3/1989 | Jacobsen | 370/112 |
| 4,825,352 | 4/1989 | Iijima et al. | 364/569 |
| 4,825,409 | 4/1989 | Bessolo et al. | 365/154 |
| 4,849,919 | 7/1989 | Haneda | 371/12 |
| 4,851,987 | 7/1989 | Day | 364/707 |
| 5,003,501 | 3/1991 | Podkowa | 364/569 |
| 5,050,113 | 9/1991 | Podkowa et al. | 364/569 |
| 5,267,222 | 11/1993 | Williams et al. | 368/155 |

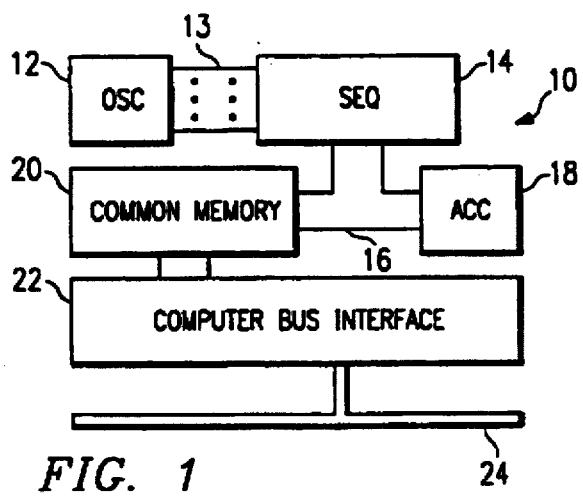
FIG. 1
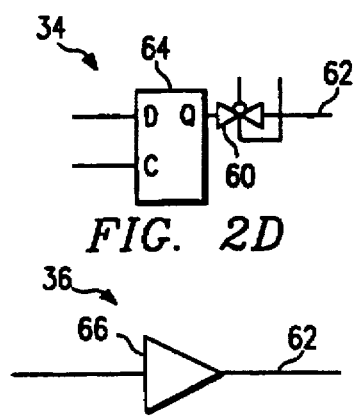
FIG. 2D
FIG. 2E
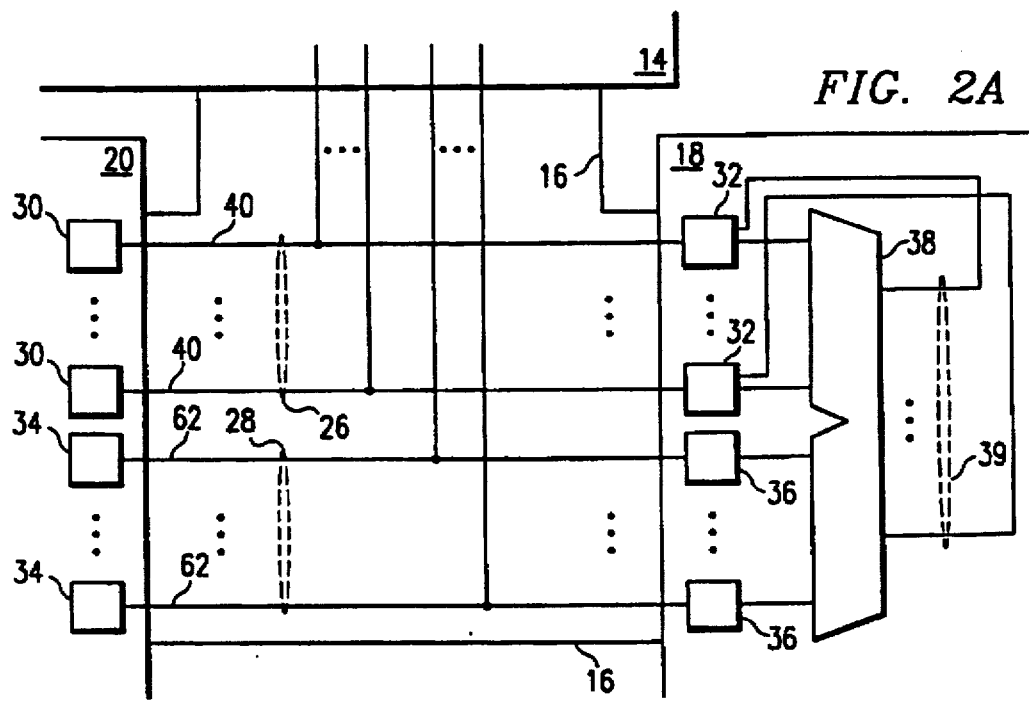
FIG. 2A
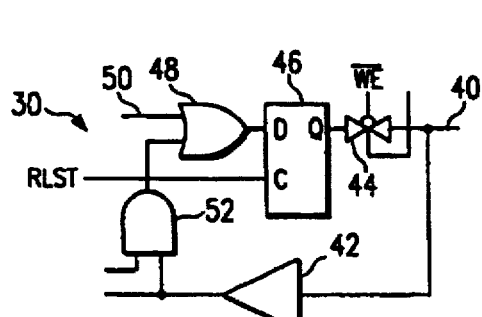
FIG. 2B
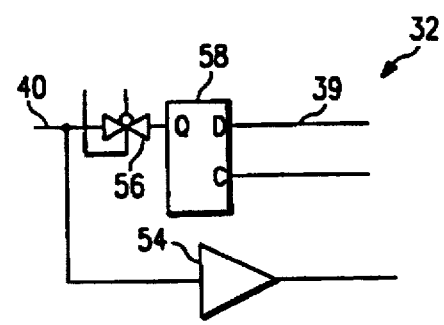
FIG. 2C

1

LOW POWER TIMEKEEPING SYSTEM

This application is a continuation of application Ser. No. 08/142,755, filed on Oct. 25, 1993, which was abandoned upon the filing hereof which is a division of application Ser. No. 717,215, filed Jun. 18, 1991 U.S. Pat. No. 5,267,222.

REFERENCE TO RELATED APPLICATIONS

Reference is made to a first related application entitled DUAL STORAGE CELL MEMORY, Ser. No 253,424, filed Jun. 7, 1988 in the names of Jiang, Ching-Lin and Williams, Clark R.; to a second related application entitled DYNAMIC CMOS BUFFER FOR LOW CURRENT SWITCHING, Ser. No. 208,287, filed Jun. 17, 1988 in the names of Williams, Clark R. and Podkowa, William J.; to a third related application entitled DELAY CIRCUIT PROVIDING SEPARATE POSITIVE AND NEGATIVE GOING EDGE DELAYS, Ser. No. 208,288, filed Jun. 17, 1988 in the names of Podkowa, William J. and Williams, Clark R.; to a fourth related application entitled ARBITRATION OF DATA WRITTEN INTO A SHARED MEMORY, Ser. No 208,890, filed Jun. 17, 1988 in the names of Podkowa, William J. and Williams, Clark R.; and to a fifth related application entitled DYNAMIC PLA TIMING CIRCUIT, Ser. No. 208,891, filed Jun. 17, 1988 in the names of Williams, Clark R. and Podkowa, William J. These applications disclose and claim a dual memory cell, a dynamic buffer circuit, a one shot circuit, arbitration circuitry, and timing circuitry for use with a PLA ROM respectively which are used in the preferred embodiment of the present invention.

TECHNICAL FIELD

The present application pertains to timekeeping circuits and, more particularly, to low power timekeeping circuits.

BACKGROUND OF THE INVENTION

Most computers include a timekeeping module or system which keeps track of the present time of day and date using its own oscillator. These timekeeping systems receive their primary power from the computer system but have backup batteries in order to preserve the time data when the primary power source fails. Since the useful life of the backup battery depends generally on the amount of current drawn by the timekeeping system, the power supply current used by the timekeeping system generally determines how often battery replacement is required. Therefore it can be appreciated that a timekeeping system which operates with a relatively small amount of power supply current is highly desirable.

SUMMARY OF THE INVENTION

It is, therefore, an object of this invention to provide a timekeeping system which requires a relatively small amount of power supply current.

Shown in an illustrated embodiment of the invention is a method for keeping time which includes reading seconds data from a memory, incrementing the seconds data, and storing the incremented seconds data back into the memory. If the seconds data, before being incremented, was 59 seconds, then the minutes data is read, incremented, and the incremented minutes data is stored in the memory. If the minutes data, prior to being incremented, was at 59 minutes, then the hours data is read from the memory, incremented, and the incremented hours data is stored back into the memory.

Also shown in an illustrated embodiment of the invention is a method for keeping time in a timekeeping system which includes a sequencer, a memory, and an accumulator connected together by a data bus which includes placing the seconds data onto the data bus by the memory and reading the seconds data in the accumulator. The accumulator increments the seconds data and writes the incremented seconds data onto the data bus. The incremented seconds data is stored in the memory and the memory holds the incremented seconds data on the data bus until at least a next read operation by the memory or a next write operation by the accumulator.

BRIEF DESCRIPTION OF THE DRAWINGS

The aforementioned and other features, characteristics, advantages, and the invention in general, will be better understood from the following, more detailed description taken in conjunction with the accompanying drawings in which:

FIG. 1 is a block diagram of a timekeeping system according to the present invention;

FIG. 2 is a logic diagram of the data bus interface circuitry for the sequencer, accumulator, and common memory of FIG. 1;

Figure 6:
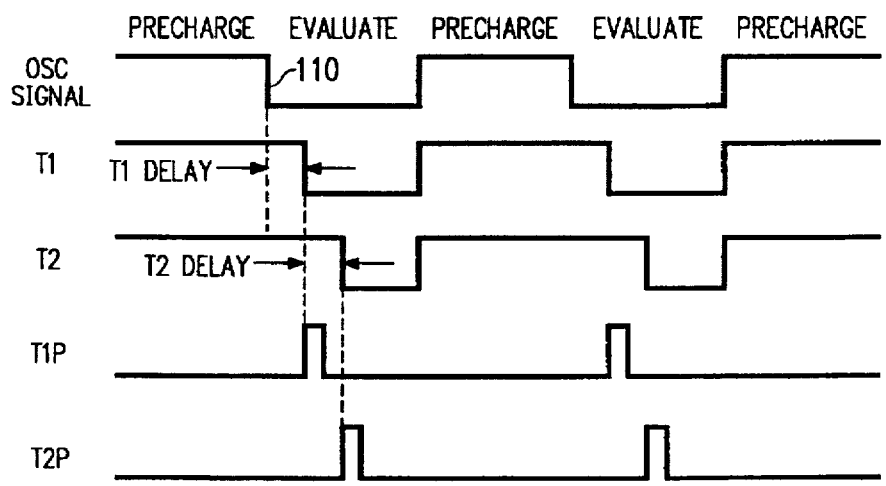
FIG. 6 is a timing diagram of certain signals in the timekeeping system of FIG. 1.

It will be appreciated that for purposes of clarity and where deemed appropriate, reference numerals have been repeated in the figures to indicate corresponding features, and that the timing signals shown in FIG. 6 have not necessarily been drawn to scale in order to more clearly show timing relationships in the preferred embodiment of the present invention.

DESCRIPTION OF THE PREFERRED EMBODIMENT

A timekeeping system according to the preferred embodiment of the present invention consists primarily of an oscillator, a sequencer, a memory, and an accumulator. Various signal lines connect the major blocks of circuitry listed above, and the sequencer, memory, and accumulator are also connected by two data buses, an A data bus and a B data bus.

In operation a clock line from the oscillator to the sequencer is usually at a logic 1 level, but becomes a pulse train for a period of time at one second intervals. The sequencer is a state machine which performs an update cycle each second. The update cycle consists of two segments, an update sequence for updating the time stored in the memory, and an alarm sequence for comparing the present time to alarm data stored in the memory. When the clock signal into the sequencer transitions to a logic 0 level to begin the pulse train, the sequencer begins the update cycle by performing first the update sequence. The update sequence consists of reading the seconds data from the memory, testing the seconds data to see if it reads 59 seconds, incrementing the seconds data and writing the incremented seconds data back to the memory. If the seconds data was not 59 seconds, then the sequencer enters into the alarm sequence. If the seconds data was 59 seconds, then the minutes data is read, incremented, and written back into the memory. If the minutes data was not 59 minutes, then the sequencer enters into the alarm sequence, and if the minutes data was 59 minutes, then the sequencer reads hours. In a similar manner the sequencer, as required, updates the hours, days of the week, date of the month, month, and year data stored in the memory.

When the sequencer enters the alarm sequence, the present seconds data is compared to the alarm seconds data and if a match is not found the sequencer sends a signal to the oscillator to hold the clock line at a logic 1 level. If a match is found, then the minutes alarm data is compared to the minutes present time data, if a match is found then the hours alarm data is compared to the hours present time data. If an hour match is found then a signal is sent from the sequencer indicating that the alarm match has been made. At this point the sequencer again sends a signal to the oscillator to hold the clock line at a logic 1 level.

The A data bus is used to transfer the present time data between the sequencer in the memory and the accumulator. The B data bus is used either to provide a second number to the accumulator from the sequencer or to transfer the alarm data from the memory to the accumulator. Since in the majority of the times the sequencer will read the seconds data and increment the seconds data and then enter into the alarm sequence in which the seconds data is reread to be compared to the alarm seconds data, the data on the A bus usually changes state only once per update cycle thereby saving the power supply current which would be required to charge and discharge the lines of the A data bus several times during each update.

The timekeeping system of the present invention advantageously saves power by sequencing only as far in the update cycle and the alarm cycle as is needed during each update cycle and being inactive during the rest of the one second interval, therefore requiring only a small amount of power supply current. Thus, the electrical energy required for each update cycle varies with the amount of time data required to be updated. Also, the sequencer in the preferred embodiment uses a PLA array of ratioless logic which provides a low power state machine. Moreover, since the A data bus usually only changes once and the B data bus usually stays at the same logic state during each update cycle, the amount of current required to charge and discharge these data buses is minimal for each update cycle on the average.

Turning now to the drawings, FIG. 1 is a block diagram of a timekeeping system 10 according to the present invention. The timekeeping system 10 includes an oscillator 12 which is connected by several lines 13 to a sequencer 14. The sequencer 14 is connected to a system bus 16 which is also connected to an accumulator 18 and a common memory 20. The common memory 20 is connected to a computer interface 22 which in turn is connected to a computer bus 24.

The common memory 20 includes an array of dual memory cells as described in the aforementioned related application entitled DUAL STORAGE CELL MEMORY and incorporated herein by reference. The common memory 20 allows a user to write the present time into the common memory through the computer bus interface 22. As will be described later, other data is also loaded and stored in the common memory 20 through the computer bus interface 22. In order to avoid collisions between the present time entered by the user on the computer bus 24 and the time being written into the common memory by the sequencer 14, arbitration logic is contained within the timekeeping system 10 as described in the aforementioned related application entitled ARBITRATION OF DATA WRITTEN INTO A SHARED MEMORY and incorporated herein by reference.

FIG. 2A is a block diagram of the system bus 16 which includes an A data bus 26 and a B data bus 28. Both the A data bus 26 and the B data bus 28 each have eight data lines and are connected to the sequencer 14, the accumulator 18, and the common memory 20. Each of the eight lines of the A data bus 26 is connected in an interface circuit 30 inside the common memory 20. The eight data lines of the A data bus 26 are also connected to an interface circuit 32 in the accumulator 18 and to the address lines of a PLA array in the sequencer 14. Each of the eight data lines of the B data bus 28 are connected to an interface circuit 34 in the common memory 20 and to an interface circuit 36 in the accumulator 18. Each of the eight data lines of the B data bus 28 is connected to eight data lines in the PLA array inside the sequencer 14. The accumulator 18 includes an ALU circuit 38, the output of which on lines 39 is fed back into the interface circuits 32.

FIG. 2B is a logic diagram of the interface circuit 30 wherein one of the lines 40 of the A data bus 26 is connected to the input of an input buffer 42 and also to one of the data terminals of a transmission gate 44. The control terminals of the transmission gate 44 are connected to complementary control signals which enable or disable the transmission gate 44. The other signal terminal of the transmission gate 44 is connected to the Q output of a D latch 46. The D latch 46 receives a clock signal from inside the common memory 20. The D input of the D latch 46 is connected to the output of an OR gate 48, one input of which is connected to a data line 50 in the common memory 20. The second input of the OR gate 48 is connected to the output of an AND gate 52. One input of the AND gate 52 is connected to the output of the buffer circuit 42. The output of the buffer circuit 42 provides one data input line to the common memory 20. The second input of the AND gate 52 is connected to a control signal inside the common memory 20.

The interface circuit 30 operates during a memory read operation by latching the data on a data line 50 into the D latch 46 while the output of the AND gate 52 is held at a logic 0 level. The Q output of the D latch 46 is passed through the transmission gate 44 onto the A bus 26. During a memory write operation the transmission gate 44 is made nonconductive and the data on line 40 is passed through the buffer 42 to write circuitry inside the common memory 20. Also during a memory write operation, the data at the output of the buffer 42 is passed through the AND gate 52 and the OR gate 48 and latched into the D latch 46. After the memory write operation, the transmission gate 44 is made conductive so that the common memory 20 is holding the data on the A bus 26 which was just previously written into the common memory 20.

The interface circuit 32 in FIG. 2C includes a buffer 54, a transmission gate 56, and a D latch 58 which are configured like the buffer 42, the transmission gate 44, and the D latch 46 of FIG. 2B. However, the interface circuit 32 does not include the OR gate 48 or the NAND gate 52 of FIG. 2B.

Similarly, the interface circuit 34 shown in FIG. 2D includes a transmission gate 60, one signal input of which is connected to one line 62 of the B data bus 28. The other signal input of the transmission gate 60 is connected to the Q output of a D latch 64 which receives data from the common memory 20 at the D input of the D latch 64 and also receives a clock signal at the clock input of the D latch 64.

Thus, the interface circuit 34 is able to provide data onto the B data bus 28, but not to read data from the B data bus.

The interface circuit 36 as shown in FIG. 2E includes only a buffer circuit 66 for receiving data from the B data bus 28.

Figure 3:
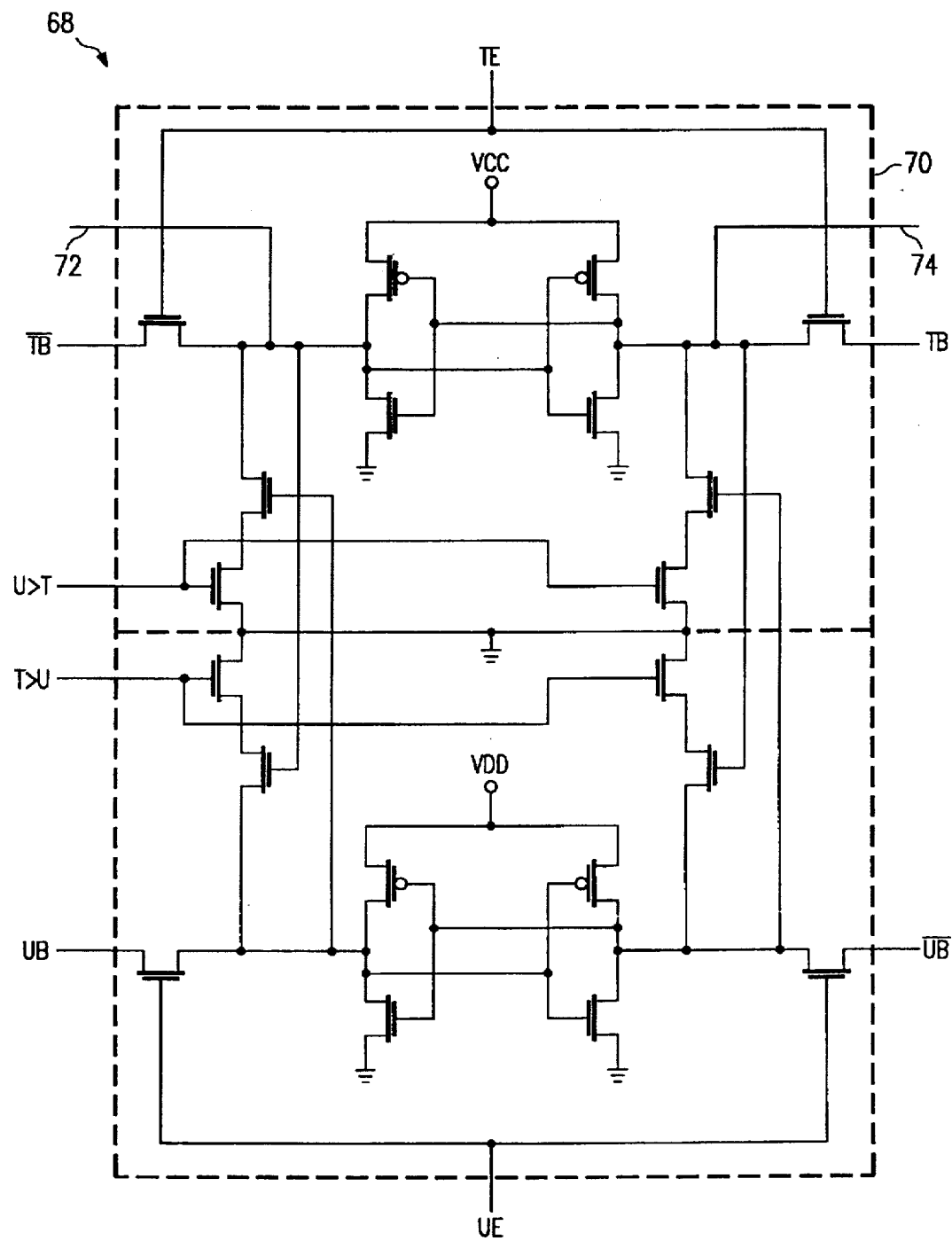
FIG. 3 is a schematic diagram of a dual memory cell used in the common memory of FIG. 1.

FIG. 3 is a schematic diagram for the dual memory cell 68 used in a portion of the common memory 20 and described in detail in the aforementioned related application entitled DUAL STORAGE CELL MEMORY. The memory cell 68 shown in FIG. 3 includes an upper timekeeping portion 70 which includes two additional lines 72 and 74 not shown in the aforementioned related application entitled DUAL STORAGE CELL EMORY. Each of the lines 72 and 74 are connected to the data nodes inside the six-transistor memory cells of the timekeeping section 70 of the dual memory cell 68. These additional lines 72 and 74 are connected to buffer circuitry (not shown) and allows data to be read directly out of these cells without requiring a normal read operation in the common memory 20. Thus, the data taken from these memory cells is continuously available. These logic cells shown in FIG. 3 are used in the common memory 20 for those cells storing the day of the week, date of the month, month, and year and are provided to the sequencer 14 on the system bus 16 and used by the sequencer 14 in a manner described below.

Figure 4:
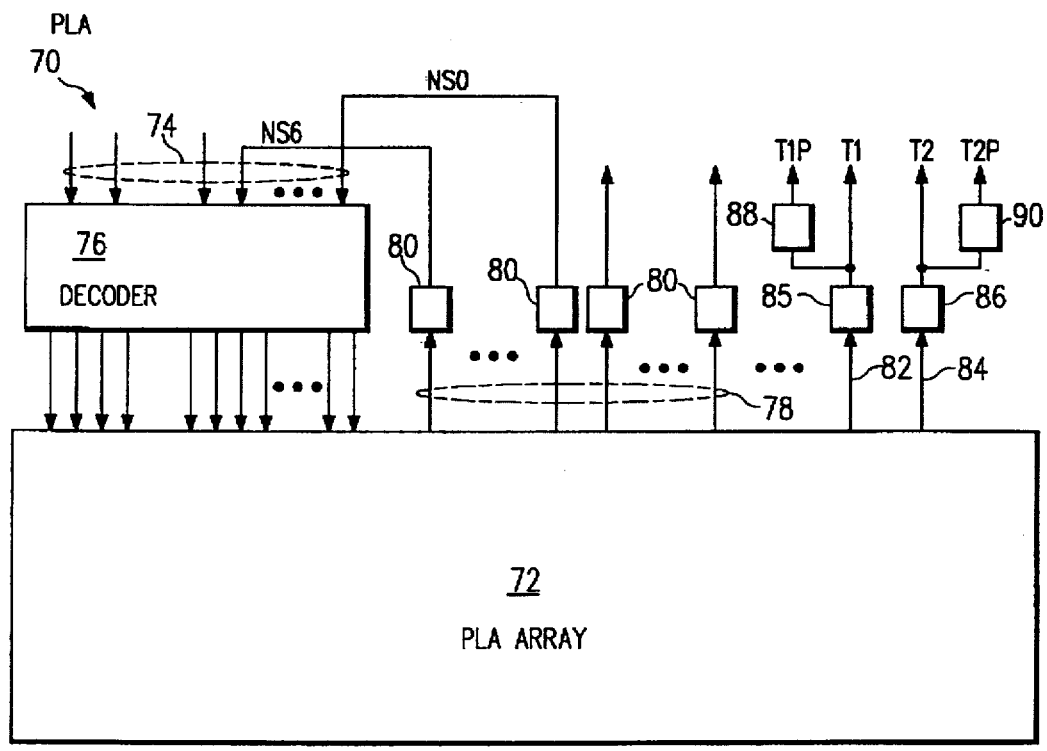
FIG. 4 is a block diagram of the PLA portion of the sequencer of FIG. 1.

Turning now to FIG. 4, a block diagram of the PLA 70 including a PLA array 72 as shown. The PLA 70 and the PLA array 72 are described in the aforementioned related application entitled DYNAMIC PLA TIMING CIRCUIT which is hereby incorporated by reference. The PLA circuit receives a plurality of address lines 74 which are connected as inputs into an address decoder circuit 76. The address decoder circuit 76 provides true and complementary address lines into the PLA array 72 for each of the address lines 74. The PLA circuit 70 also includes a plurality of data lines 78 which are connected to precharge and latch circuits 80 as described in the aforementioned related application entitled DYNAMIC PLA TIMING CIRCUIT. Two additional data lines 82 and 84 are connected as inputs to dynamic buffer circuits 85 and 86 which are described in the aforementioned related application entitled DYNAMIC CMOS BUFFER FOR LOW CURRENT SWITCHING which is hereby incorporated by reference. The outputs of the buffer circuits 85 and 86 form timing signals T1 and T2 respectively which are also connected as inputs to two one-shot circuits 88 and 90, the outputs of which form signals T1P and T2P respectively. The one shot circuits 88 and 90 are described in the aforementioned related application entitled DELAY CIRCUIT PROVIDING SEPARATE POSITIVE AND NEGATIVE GOING EDGE DELAYS and incorporated herein by reference.

Seven of the data lines 78 form signals $NS_0$–$NS_6$ which are the next state data lines which are used as inputs into the address decoder circuit 76. The outputs of the address decoder circuit 76 corresponding to the next state input lines forms the present state address lines into the PLA array 72.

The address lines 74 consist of 23 addresses, 7 of which are the next state data lines out of the PLA array, and 8 of which come from the A data bus 26. The remaining consist of a FEB address line which is high (logic 1 level) when the present month is February; an LEAP address line which is high when the present year is a leap year; a THRT address line which is high when the present month has 30 days; an HRM address line which is high when the stored data is for a 24 hour clock and low (logic 0 level) when the data is for a 12 hour a.m., p.m. clock; a DM address line which is high when the data is stored in binary format and low when the data is stored in BCD format; an S line which is high on the first Sunday of April, the day when the switch is made from standard time to daylight savings time; an F address line which is switched high at the start of the last Sunday in October when the switch is made from daylight savings time to standard time; and an EQLZ address line which is one when the accumulator compares the data on the A bus 26 and the B bus 28 and finds the two buses have the same data. The FEB, LEAP, THRT, S, and F address lines are formed by combinational logic in the sequencer 14 from data taken from the signal lines 72 and 74 of the timekeeping cells 68 storing the present day of the week, date of the month, month, and year data.

There are 29 data lines 78 out of the PLA array 72 not including the two timing lines 82 and 84. The 29 data lines include eight data lines providing data to the B data bus 28 and the seven data lines for the next state into the address lines 74 of the PLA 70. The other data lines are as follows: a UDC data line which when ANDed together with the T2P timing signal forms a signal back to the oscillator to tell the oscillator to hold the clock signal on lines 13 from the oscillator to the sequencer at a logic 1 level until time for the next update cycle; an ALMF data line which provides a signal to an interrupt mask circuit in the common memory 20 which, if enabled by the user, will cause an interrupt to be presented on the computer bus 24 and is used to signal that an alarm match has been found; four data lines $TAD_0$–$TAD_3$ which are address lines into the common memory 20; an ALPHA data line which is used to reset a latch circuit when the timekeeper switches from daylight savings time to standard time to 1:00 a.m. on the last Sunday in October. This ALPHA signal changes the state of the F address line so that the sequencer won't set its time back one hour more than once each year. An RWB data line to signal the memory whether to read or write data; an RAMEN data line which, when at a logic 1, enables the common memory 20 to read or write data and when at a logic 0 causes the common memory 20 to precharge the timekeeping bit lines in the memory; an ALMM line to signal that the sequencer is in an alarm sequence rather than a time update sequence; three signal lines S0–S2 to the accumulator 18 to control whether the accumulator is to transfer data from the B bus onto the A bus, to increment the data on the A bus or to add the A bus to the B bus and place the resultant on the A bus; and a CI data line as a carry input into the accumulator 18.

These address lines and data lines are combined in the PLA array 72 to provide the operational sequence shown in the flow chart of FIG. 5. As shown in FIG. 5 the sequencer 14 begins an update cycle in block 100 by first reading seconds data which corresponds to a present state address of 7A. Following the 7A state the sequencer 14 enters into the 7E state in which it evaluates the seconds data and then performs one of three operations: either to add seven to the seconds data (state 3F) if the seconds data is in BCD format and the time is X9 (e.g. 09,19,29, etc.) but not 59; load 00 into the accumulator if the seconds data is at 59 either in BCD or binary format and go to state 3E; or, if neither of the previous conditions are satisfied, to add one to the seconds data (state 79).

If the sequencer 14 enters state 7F or 3F, then the next operation is a write into the memory of the data on the A bus shown as state 7D. After this write in state 7D the sequencer enters into the alarm sequence shown in FIG. 5E. Thus, in 59 cases out of 60 the sequencer will have progressed from reading the seconds data, updating the seconds data, writing the seconds data back into the common memory, and then entering into the alarm sequence.

If the sequencer enters into state 3E, it then writes 00 seconds data back into the memory and then enters into a precharge cycle 7C in which the timekeeping bit lines in the common memory are precharged prior to a read operation and also the minutes address into the memory is selected. The next cycle is a read minutes operation, state 75. The state 75 is followed by a state 77 which is similar to the state 7E for the seconds operation. If the minutes data is at 59 minutes, then 00 is written into the minutes portion of the memory and the memory is again precharged in step 6C and the address is selected in order to read the hours in step 6E. If the minutes data is not 59 minutes, the minutes data is incremented (state 7F or 3F), written into the memory (state 7D), and the sequencer begins the alarm sequence.

After the hours are read, the sequencer enters step 6A which has many options depending on whether the data is binary or BCD, whether the time is for a 12 hour clock or a 24 hour clock, whether the hours are switching from 11 a.m. to 12 p.m., from 11 p.m. to 12 a.m., from 12 p.m. to 1 p.m. or from 12 a.m. to 1 a.m., and whether it is time to switch between standard time and daylight savings time. If the hour data read is not 12:00 a.m., then the hour data is incremented (state 7F or 3F), written into memory (state 7D), and the sequencer begins the alarm sequence.

If the hour is changing to 12:00 a.m., then the sequencer reads the day of the week, updates the day of the week, and reads the date of the month, and, if the date is the last day of the month, updates the date of the month in state 65 to 01 and reads the month data. If the date is not the last day of the month, the date is incremented (state 7F or 3F), written into memory (state 7D), and the sequencer begins the alarm sequence. The date of the month change is determined by the number of days in the particular month and whether the year is a leap year or not.

If the month is changing to January, then the year data is read and updated. If the month read is not December, then the month data is incremented (state 7F or 3F), written into memory (state 7D), and the sequencer begins the alarm sequence. After the year data is updated, the sequencer begins the alarm sequence.

Figure 5A:
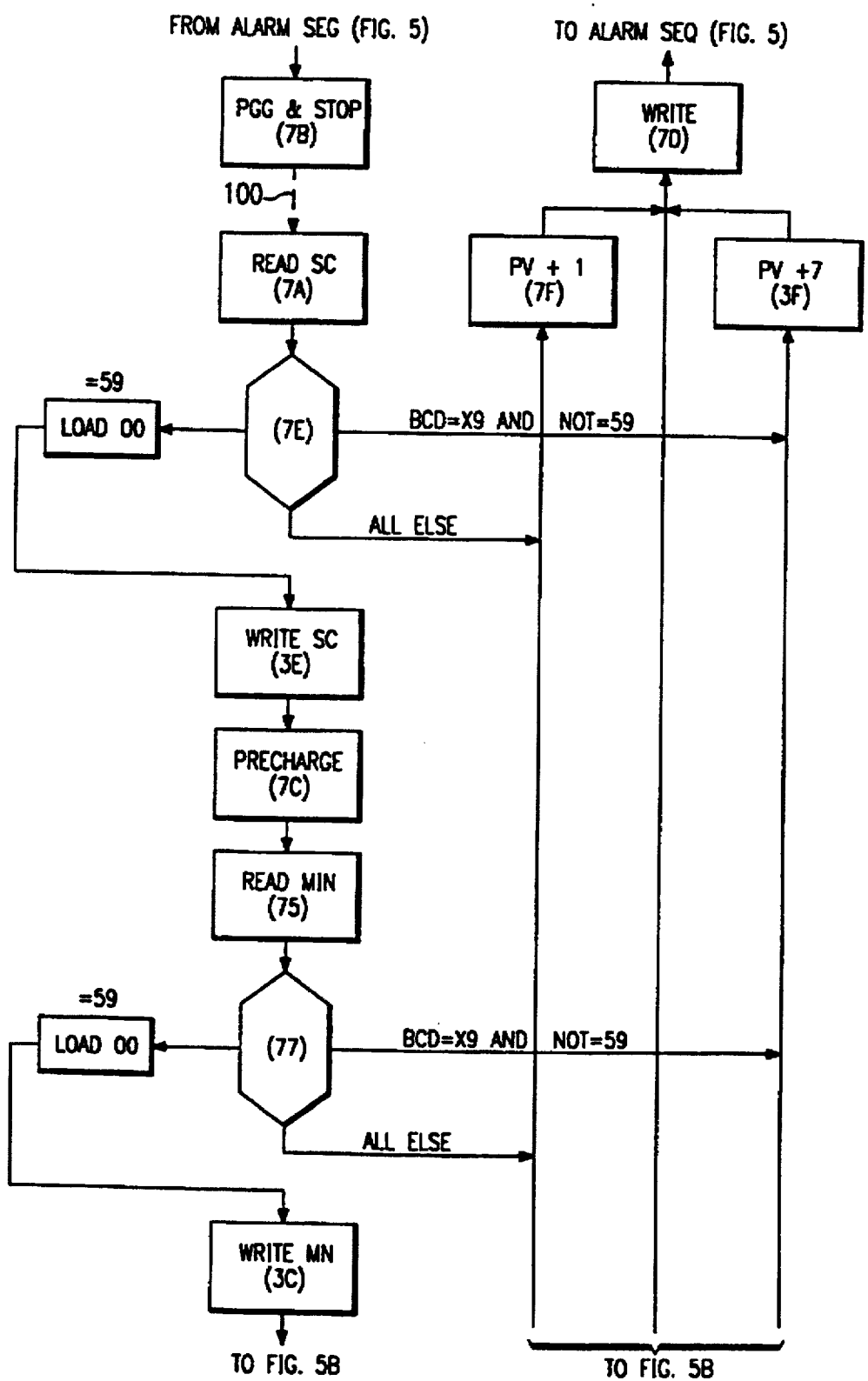
FIG. 5 is a flow diagram of the timekeeping system according to the present invention.
Figure 5B:
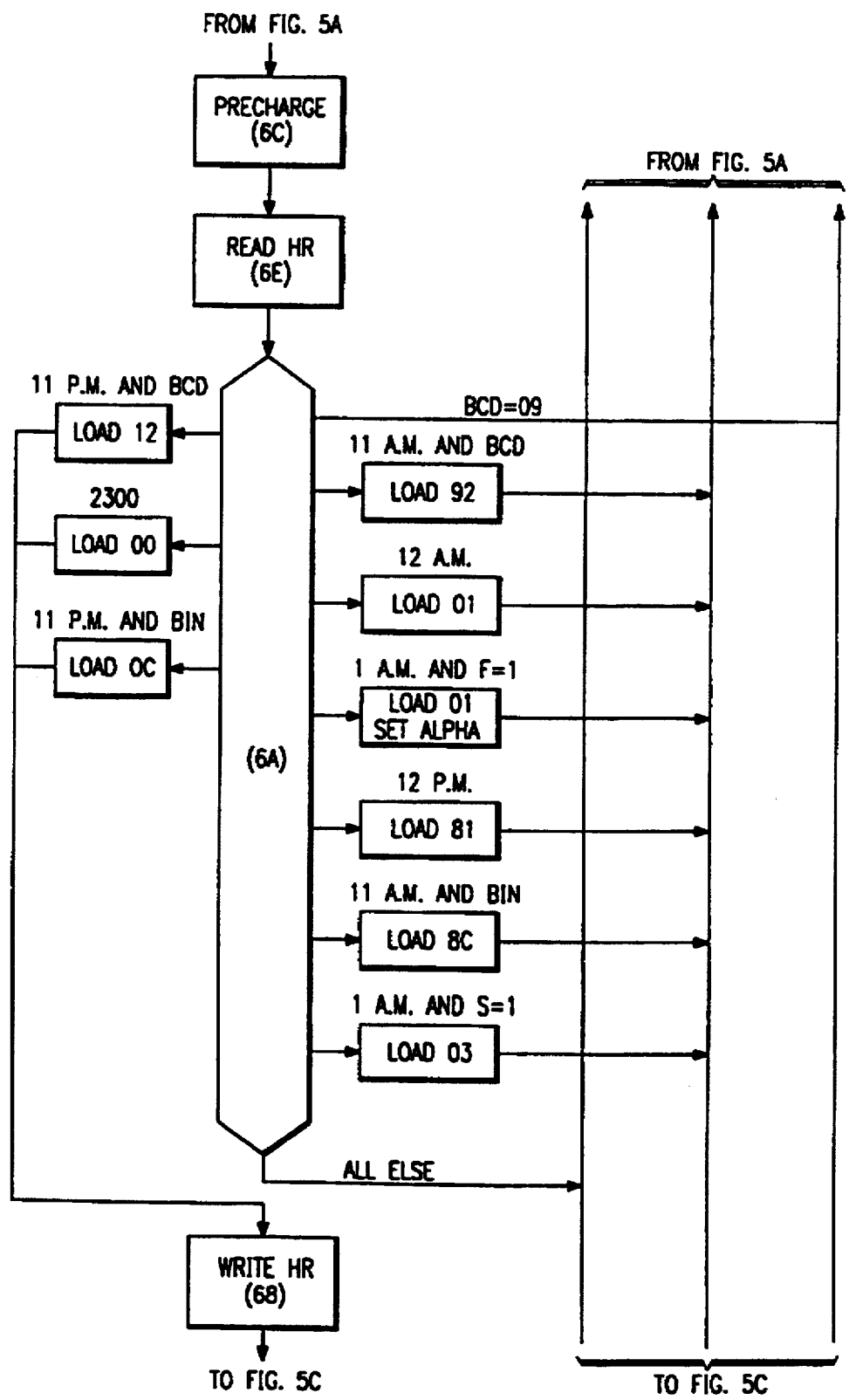
Figure 5C:
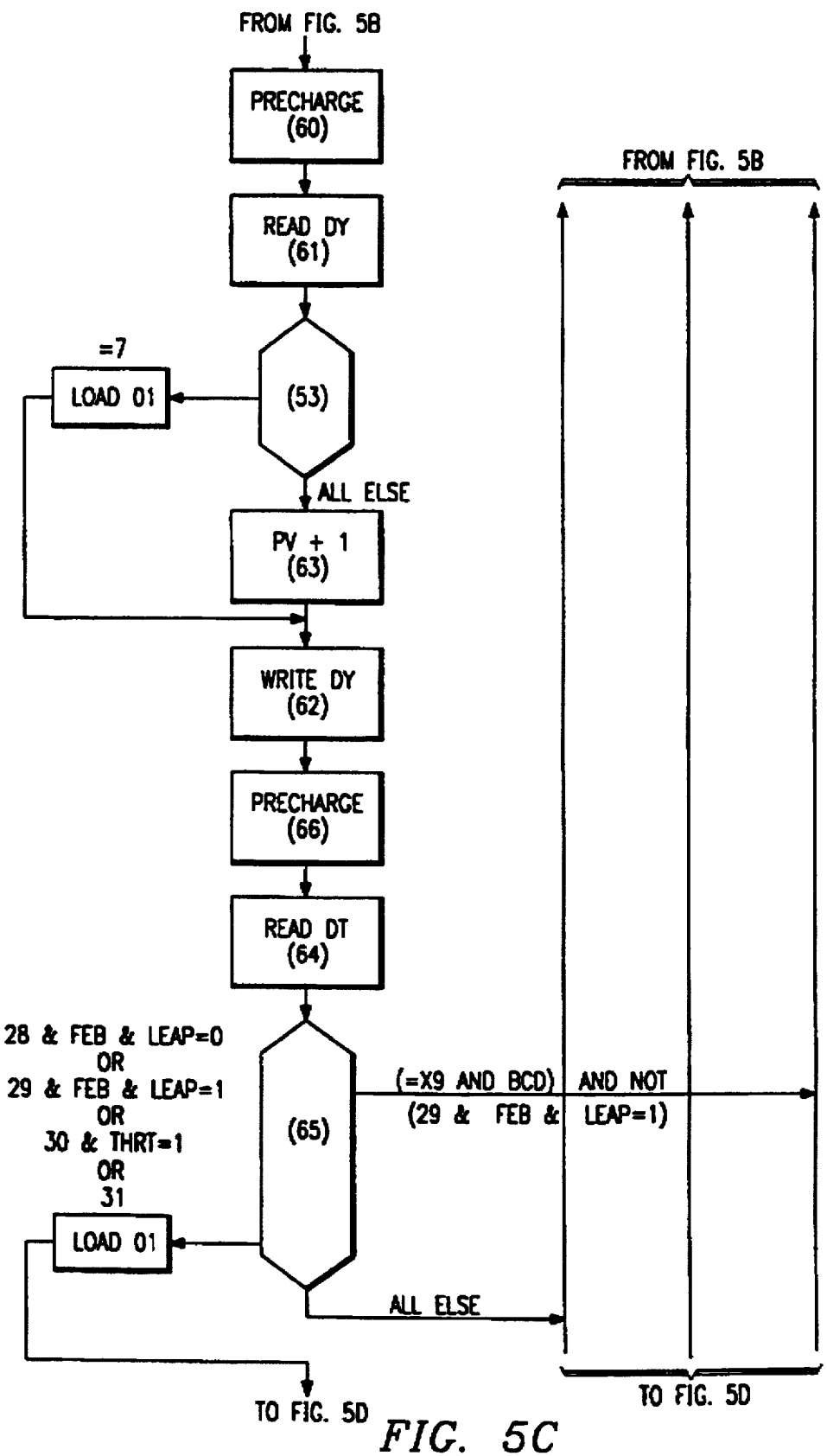
Figure 5D:
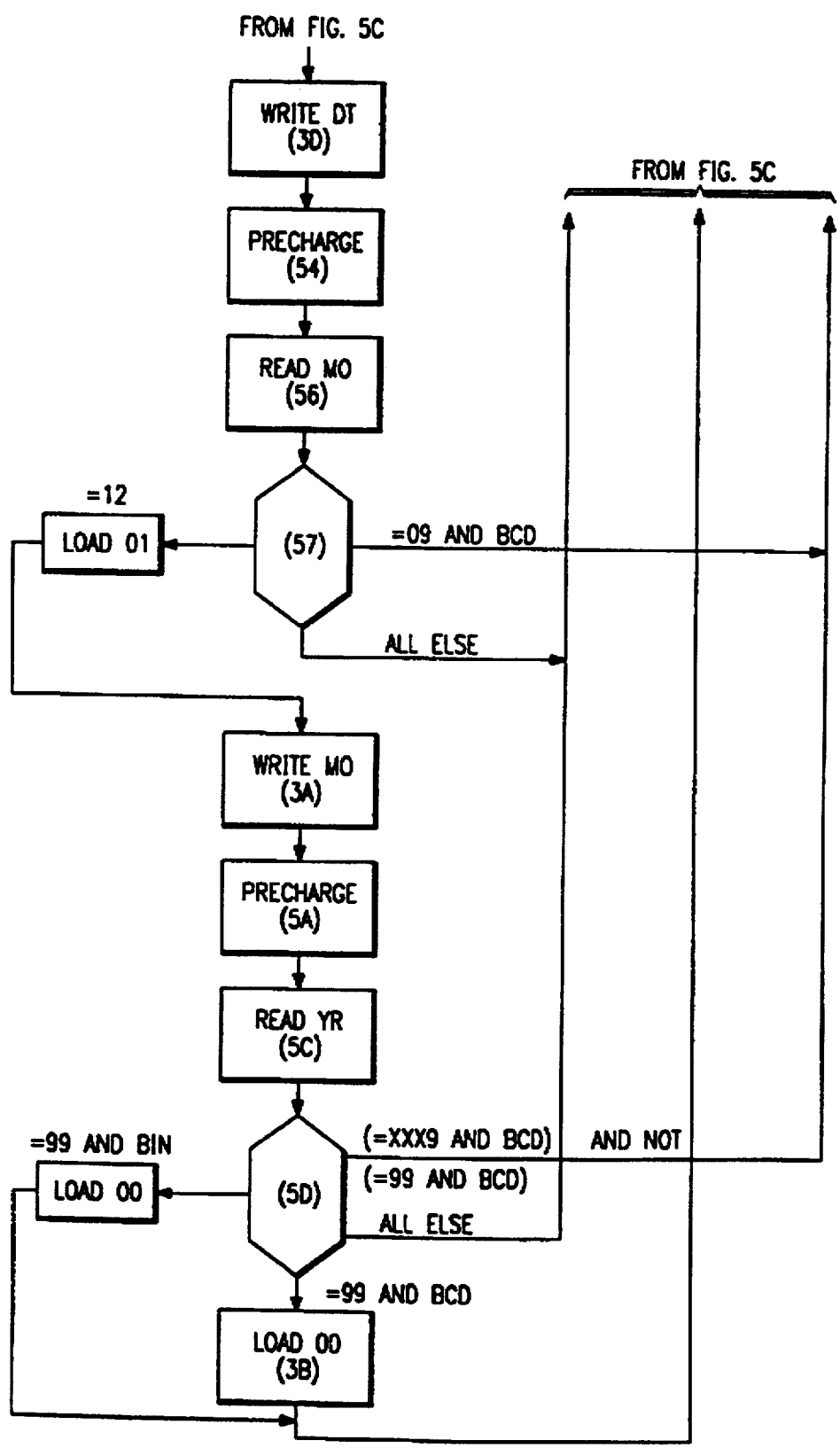
Figure 5E:
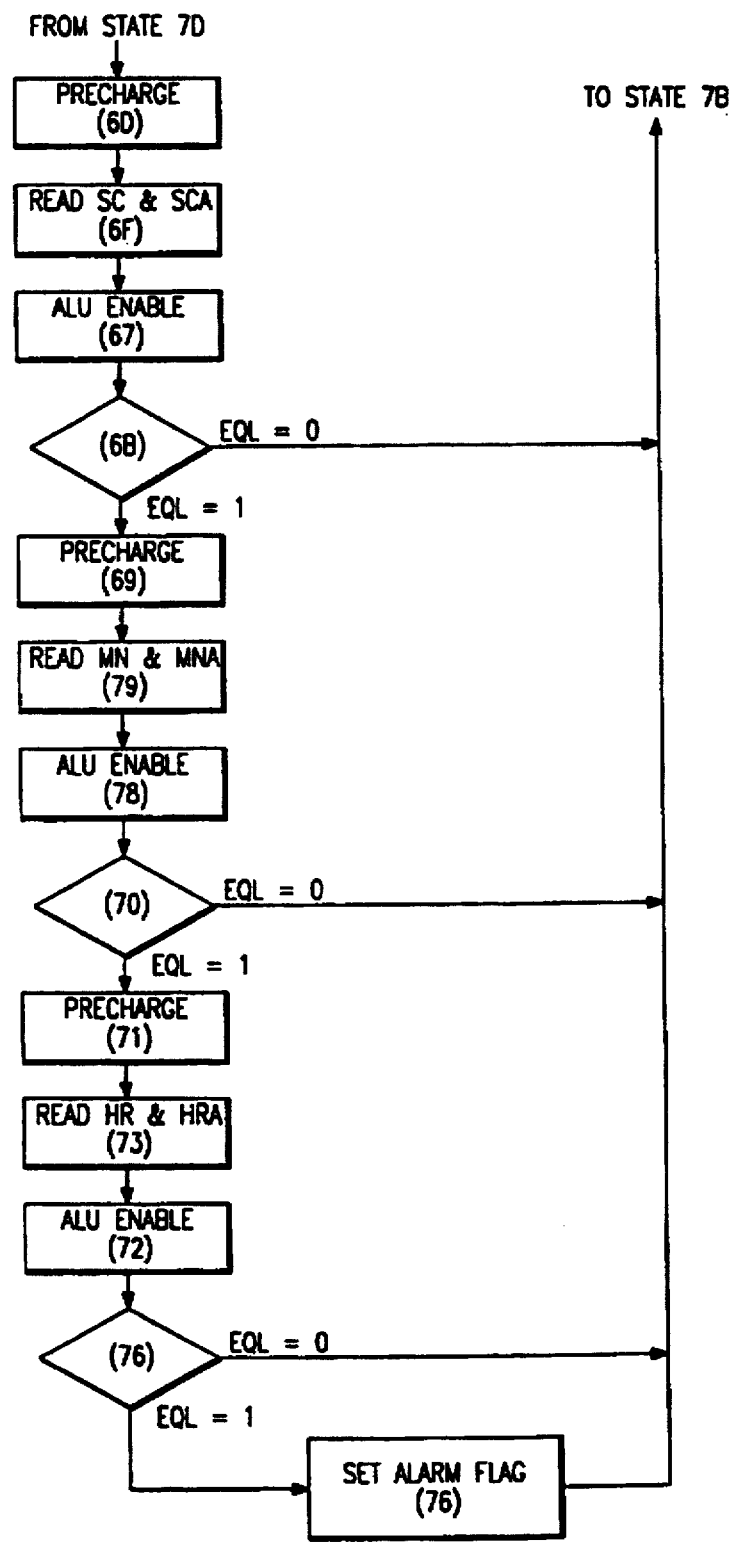

As shown in FIG. 5E the alarm sequence consists of first precharging the timekeeping bit lines in the common memory 20 (step 6D) and then reading the seconds data and the seconds alarm data (step 6F) and then enabling the ALU to compare the data on the A data bus 26 and the B data bus 28. If there is a match in step 6B, then the minutes data and minutes alarm data is read in step 79 and another comparison is made in step 78. If the minutes match, then the hours and the hours alarm data is read and compared and if there is a match at this point, then the alarm flag is set in step 76. Any time a match is not made the sequencer branches to state 7B which precharges the timekeeping bit lines of the common memory, sets the address lines to read the seconds data, and issues a command on data line UDC to cause the oscillator to hold the clock line to the sequencer at a logic 1 level until the next update cycle.

FIG. 6 is a timing diagram showing the clock signal from the oscillator 12 to the sequencer 14 for the first two states of the sequencer 14. At time 110, the signal from the oscillator 12 goes from a logic 1 to a logic 0 after being held high after the last update cycle. This transition at time 110 initiates another update cycle. Prior to time 110, the sequencer 14 is in a precharge operation. At the time 110 the sequencer 14 enters an evaluate cycle and timing signals T1, T2, T1P, and T2P shown in FIG. 6 are generated. The falling edge of the T1 signal generates the T1P signal which latches the data out of the PLA array 72 and the T2P timing pulse is used to control the transmission gates connected to the lines on the A data bus 26 and the B data bus 28. Following the initial evaluate cycle the sequencer 14 enters into another precharge cycle and this process is repeated until the sequencer enters into state 7B at which time it sends a signal to the oscillator to hold the clock line at a logic 1 level until the next update cycle is to begin. In the preferred embodiment the pulse train out of the oscillator 12 into the sequencer 14 shown in FIG. 6 has a frequency of 4096 HZ, the T1 and T2 delay times are on the order of 0.5 microseconds, and the T1P and T2P pulses have a width of about 50 nanoseconds.

Significantly, the data on the A data bus 26 changes only once in 58 out of every 60 update cycles since the sequencer only reads seconds unless the seconds data is at 59 or if the seconds data matches the seconds alarm data. Also after each write operation, the incremented seconds data is written into the memory and immediately written back onto the A data bus by the interface circuit 30 of the common memory 20.

Thus, there has been described a timekeeping system which operates with a minimum number of sequential states and which minimizes the number of logic level changes on the primary data bus to thereby provide a low power timekeeping system in comparison to systems which read all time data on each update cycle or which use approximately the same electrical energy for each update cycle.

Although the invention has been described in part by making detailed reference to a certain specific embodiment, such detail is intended to be, and will be understood to be, instructional rather than restrictive. It will be appreciated by those skilled in the art that many variations may be made in the structure and mode of operation without departing from the spirit and scope of the invention as disclosed in the teachings contained herein.

What is claimed is:

1. A method for keeping time comprising the steps of:
    (a) reading seconds data from a memory;
    (b) comparing said seconds data to 59 seconds;
    (c) incrementing said seconds data;
    (d) storing said seconds data;
    (e) if said seconds data equals 59 seconds in step (b), then
        (i) reading minutes data from said memory;
        (ii) comparing said minutes data to 59 minutes;
        (iii) incrementing said minutes data;
        (iv) storing said minutes data; and
        (v) if said minutes data equals 59 minutes in step (e)(ii), then reading hours data from said memory, incrementing said hours data, and storing said hours data,
    (f) repeating steps (a)–(e),
    wherein said memory comprises:
        a first plurality of bitline pairs;
        a second plurality of bitline pairs;
        an array of dual storage cells;
            each dual storage cell of said array of dual storage cells comprising a first latch coupled between a first pair of data nodes and a second latch coupled between a second pair of data nodes;
            and each dual storage cell of said array of dual storage cells further comprising a first pair of pass transistors coupled to said first pair of data nodes and a second pair of pass transistors coupled to said second pair of data nodes;
            said first pair of pass transistors of each dual storage cell of said array of dual storage cells coupled to at least one pair of said first plurality of bitline pairs, and said second pair of pass transistors of each dual storage cell of said array of dual storage cells coupled to at least one pair of said second plurality of bitline pairs;

each dual storage cell of said array of dual storage cells coupled to receive a first control signal and a second control signal;

and each dual storage cell of said array of dual storage cells further comprising a transfer circuit wherein, for each dual storage cell of said array of dual storage cells, the transfer circuit is coupled to said first and second pairs of data nodes and configured to drive at least one data node of said second pair of data nodes when said first control signal is activated, which data node(s) of said second pair of data nodes driven determined in accordance with logic levels of said first pair of data nodes and to drive at least one data node of said first pair of data nodes when said second control signal is activated, which data node(s) of said first pair of data nodes driven determined in accordance with logic levels of said second pair of data nodes.

2. The method of claim 1, wherein each latch is a CMOS latch;

and wherein each first pair of data nodes has a first node and a second node and each second pair of data nodes has a first node and a second node;

and wherein, for each dual storage cell of said array of dual storage cells, the transfer circuit includes a first pair of NMOS transistors connected in series between said first node of said first pair of data nodes and ground, said first pair of NMOS transistors configured to drive said first node of said first pair of data nodes toward ground if said first node of said second pair of data nodes is high and said first control signal is high;

a second pair of NMOS transistors connected in series between said second node of said first pair of data nodes and ground, said second pair of NMOS transistors configured to drive said second node of said first pair of data nodes toward ground if said second node of said second pair of data nodes is high and said first control signal is high;

a third pair of NMOS transistors connected in series between said first node of said second pair of data nodes and ground, said third pair of NMOS transistors configured to drive said first node of said second pair of data nodes toward ground if said first node of said first pair of data nodes is high and said second control signal is high; and a fourth pair of NMOS transistors connected in series between said second node of said second pair of data nodes and ground, said fourth pair of NMOS transistors configured to drive said second node of said second of said second pair of data nodes toward ground if said second node of said first pair of data nodes is high and said second control signal is high.

3. The method of claim 2, wherein, for each of dual storage cells of said array of dual storage cells, said first and second latches are CMOS static latches.

4. A method for keeping time comprising the steps of:
 (a) reading seconds data from a memory;
 (b) comparing said seconds data to 59 seconds;
 (c) incrementing said seconds data;
 (d) storing said seconds data;
 (e) if said seconds data equals 59 seconds in step (b), then
   (i) reading minutes data from said memory;
   (ii) comparing said minutes data to 59 minutes;
   (iii) incrementing said minutes data;
   (iv) storing said minutes data; and
   (v) if said minutes data equals 59 minutes in step (e)(ii), then reading hours data from said memory, incrementing said hours data, and storing said hours data;
 (f) repeating steps (a)–(e), wherein said memory comprises a plurality of storage cells, each storage cell of said plurality of storage cells comprising a first memory cell and a second memory cell;

each first memory cell of said plurality of storage cells having a first data node and a second data node with cross coupled invertors connected therebetween, each first memory cell of said plurality of storage cells also having a first enable line input, each first memory cell of said plurality of storage cells coupled to a first complementary pair of bit lines;

each said second memory cell of said plurality of storage cells having a first data node and a second data node with cross-coupled invertors connected therebetween, each second memory cells of said plurality of storage cells also having a second enable line input, each second memory cell coupled to a second complementary pair of bit line connections; wherein, for each storage cell of said plurality of said storage cells, said first date node of said second memory cell coupled to ground through a series connection of a first switch and a second switch, said second switch responsive to a signal on said first data node of said first memory cell of said storage cell of said plurality of storage cells;

all of said first enable line inputs of all of said first memory cells of said plurality of storage cells coupled together to a common first enable line;

all of said second enable line inputs of all of said second memory cells of said plurality of storage cells coupled together to a common second enable line;

all of said first memory cells of said plurality of storage cells coupled together to a common first complementary pair of bit lines; and all of said second memory cells of said plurality of storage cells coupled together to a common second complementary pair of bit lines.

5. The method of claim 4, wherein each memory cell is a six-transistor memory cell.

* * * * *

UNITED STATES PATENT AND TRADEMARK OFFICE
CERTIFICATE OF CORRECTION

PATENT NO. : 5,629,907
DATED : May 13, 1997
INVENTOR(S) : Williams, et. al.

It is certified that error appears in the above-indentified patent and that said Letters Patent is hereby corrected as shown below:

Title page, item [60],
Delete in its entirety the first paragraph under Releated U.S. Application Data and replace with--This application is a continuation of U.S. Patent Application 08/142,755 filed on October 25, 1993 (abandoned) which is a divisional of U.S. Patent Appliction 07/717,215 filed on June 18, 1991, now U.S. Patent 5,267,222 which was a continuation of U.S. Patent Application 07/208,889 filed on June 17, 1988, Now U.S. Patent 5,050,113.--

Signed and Sealed this

Twenty-third Day of September, 1997

*Attest:*

BRUCE LEHMAN

*Attesting Officer*  Commissioner of Patents and Trademarks